United States Patent
Kurokami et al.

(10) Patent No.: US 10,761,063 B2
(45) Date of Patent: Sep. 1, 2020

(54) APPARATUS AND METHOD FOR PRESUMING ABNORMALITY OCCURRENCE FOR TELESCOPIC COVER

(71) Applicant: FANUC CORPORATION, Yamanashi (JP)

(72) Inventors: Noboru Kurokami, Yamanashi (JP); Naoki Sato, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 400 days.

(21) Appl. No.: 15/819,001

(22) Filed: Nov. 21, 2017

(65) Prior Publication Data
US 2018/0143162 A1 May 24, 2018

(30) Foreign Application Priority Data

Nov. 24, 2016 (JP) .................. 2016-227720
Sep. 12, 2017 (JP) .................. 2017-174459

(51) Int. Cl.
*G01N 29/04* (2006.01)
*G01N 29/14* (2006.01)
(Continued)

(52) U.S. Cl.
CPC ............ *G01N 29/04* (2013.01); *G01N 27/20* (2013.01); *G01N 29/14* (2013.01);
(Continued)

(58) Field of Classification Search
CPC .... G01N 29/04; G01N 29/14; G01N 29/4418; G01N 29/4472; G01N 29/4481;
(Continued)

(56) References Cited

U.S. PATENT DOCUMENTS 8,781,982 B1 * 7/2014 Das .................. G06E 1/00
706/21
2003/0205892 A1  11/2003 Andrews
(Continued)

FOREIGN PATENT DOCUMENTS

CN    1748823 A    3/2006
CN   103370162 A  10/2013
(Continued)

OTHER PUBLICATIONS

Ogawa, JP2018027576A Telescopic Cover Device. Application: JP2016159251A•Aug. 15, 2016. (Year: 2016).*
(Continued)

*Primary Examiner* — Dave Misir
(74) *Attorney, Agent, or Firm* — Hauptman Ham, LLP (57) ABSTRACT

An abnormality occurrence presumption apparatus which presumes the occurrence of an abnormality in a telescopic cover attached to a machine tool performs supervised learning on the basis of a feature amount extracted from a physical quantity acquired during an operation of the machine tool and information related to an abnormality occurring in the telescopic cover, and stores the result of the learning. The abnormality occurrence presumption apparatus presumes an abnormality that may occur in the telescopic cover during the operation of the machine tool on the basis of the result of the learning and the feature amount extracted from the physical quantity.

9 Claims, 6 Drawing Sheets

(51) Int. Cl.
*G01N 29/44* (2006.01)
*G01N 27/20* (2006.01)

(52) U.S. Cl.
CPC ..... *G01N 29/4418* (2013.01); *G01N 29/4472* (2013.01); *G01N 29/4481* (2013.01)

(58) Field of Classification Search
CPC .......... G01N 27/20; G06N 3/02; G06N 3/084; G06F 30/17; G06F 30/20; G06F 2119/04; B23Q 11/0816
USPC .......................................................... 706/1
See application file for complete search history.

(56) References Cited

U.S. PATENT DOCUMENTS

| | | | |
|---|---|---|---|
| 2006/0055165 | A1 | 3/2006 | Negoro et al. |
| 2008/0133439 | A1* | 6/2008 | Ikeda ................... G01H 1/003 706/20 |
| 2012/0041575 | A1* | 2/2012 | Maeda ................ G05B 23/024 700/80 |

FOREIGN PATENT DOCUMENTS

| | | |
|---|---|---|
| CN | 105388852 A | 3/2016 |
| JP | 2000-52183 A | 2/2000 |
| JP | 2003-275945 A | 9/2003 |
| JP | 2008-87094 A | 4/2008 |
| JP | 2016-68183 A | 5/2016 |
| JP | 2018-27576 A | 2/2018 |

OTHER PUBLICATIONS

Miyake et al., JP2016068183A Shield Device for Machine Tool. Application: JP2014199113A•Sep. 29, 2014. (Year: 2014).*
Takesawa, JP2000052183A Damage Preventing Device for Cover Device. Application: JP22689198A•Aug. 11, 1998. (Year: 1998).*
Kato et al., JP2003275945A Chipping Accumulation Detecting Method and Its Device. Application: JP2002082034A•Mar. 22, 2002. (Year: 2002).*
Ikeda, JP2008087094A Tool Attaching Abnormality Detecting Device. Application: JP2006269510A•Sep. 29, 2006. (Year: 2006).*
Teti et al., "Advanced monitoring of machining operations", CIRP Annals—Manufacturing Technology 59 (2010) 717-739. (Year: 2010).*
Office Action in JP Application No. 2017-174459, dated Jun. 12, 2018, 9pp.
Office Action in JP Application No. 2017-174459, dated Nov. 20, 2018, 5pp.
Office Action in corresponding Chinese Application No. 201711176139.1 dated Nov. 7, 2019; 12 pgs.

* cited by examiner

| ABNORMALITY OCCURRENCE TIME | ABNORMALITY OCCURRENCE PART | CONTENT OF ABNORMALITY | TAKEN ACTION | ... |
|---|---|---|---|---|
| 2016/11/01 10:01:55 | PANTOGRAPH | BREAKAGE | REPLACEMENT OF PANTOGRAPH | ... |
| 2016/11/04 15:45:05 | CUSHION RUBBER FOR THIRD STEP COVER | SMALL ABRASION | NO MEASURES | ... |
| 2016/11/15 14:12:33 | COVER | DETACHMENT | REPAIR OF DETACHED SCREW | ... |
| 2016/11/17 17:01:25 | CUSHION RUBBER FOR THIRD STEP COVER | LARGE ABRASION | REPLACEMENT OF CUSHION RUBBER FOR THIRD STEP COVER | ... |
| 2016/11/21 11:11:40 | UPPER RIGHT WIPER | BREAKAGE | REPLACEMENT OF UPPER RIGHT WIPER | ... |
| 2017/01/11 09:31:10 | CUSHION RUBBER FOR SECOND STEP COVER | BREAKAGE | REPLACEMENT OF CUSHION RUBBER FOR SECOND STEP COVER | ... |
| ⋮ | ⋮ | ⋮ | ⋮ | ⋮ |

APPARATUS AND METHOD FOR PRESUMING ABNORMALITY OCCURRENCE FOR TELESCOPIC COVER

RELATED APPLICATIONS

The present application claims priority to Japanese Patent Application No. 2016-227720 filed on Nov. 24, 2016, and Japanese Patent Application No. 2017-174459 filed on Sep. 12, 2017, the disclosures of which are hereby incorporated by reference herein in their entirety.

BACKGROUND OF THE INVENTION

1. Field of the Invention

The present invention relates to an apparatus and a method for presuming abnormality occurrence for a telescopic cover, and particularly to a technique which predicts the occurrence of an abnormality such as a fracture in a telescopic cover and abrasion or breakage of cushion parts.

2. Description of the Related Art

A telescopic cover is intended to protect the internal mechanism of a machine tool (device) from chips and a cutting fluid which are generated when the machine tool performs machining. The telescopic cover has a structure which drives a multi-stage metallic cover using a telescopic member such as a pantograph to open/close the cover.

Figure 1A:
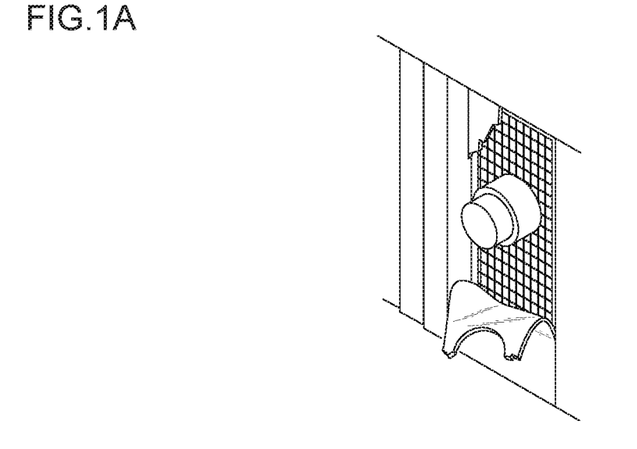
FIGS. 1A-1C are views showing examples of a broken state of a telescopic cover.
Figure 1B:
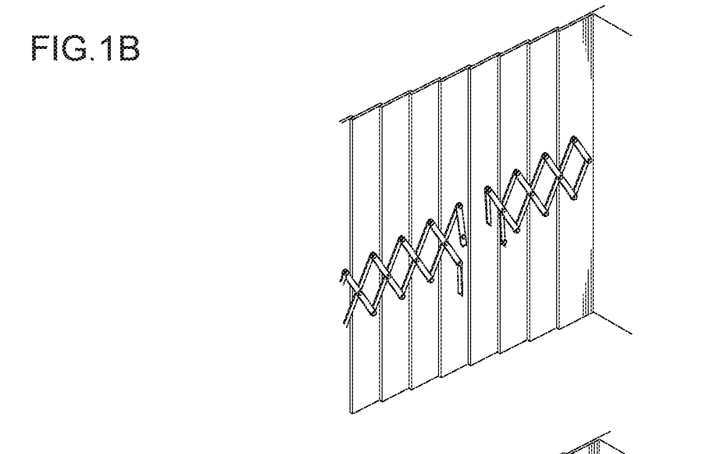
Figure 1C:
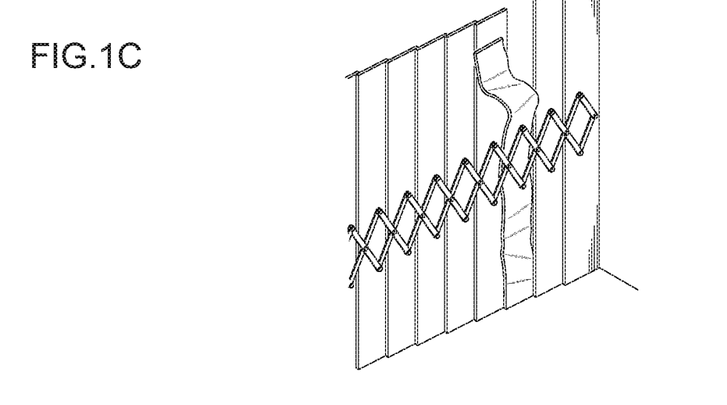

When used over a long period of time, the telescopic cover may be broken in various states. FIG. 1 shows the typical broken states of the telescopic cover. The portions enclosed in the broken lines show broken portions. FIG. 1A shows the state where the surface of the metallic cover is broken. FIG. 1B shows the state where the pantograph for driving the metallic cover is broken. FIG. 1C shows the state where a fallen metallic cover is caught by another metallic cover and broken. Such breakage is caused by various factors such as, e.g., aging degradation of each of parts induced by fatigue or wear, a loosened or detached fixation screw, deformation caused by falling of a workpiece, and an erroneous operation.

For telescopic covers other than those having pantograph structure, the telescopic plate covers included in the telescopic cover have a stationary part and a movable part. To reduce impact when the operation of the movable part is started and stopped, it is common practice to use cushioning parts made of rubber, resin, sponge, or the like and attach such cushioning parts to the inner portions of the plate covers. Since the cushioning parts of the telescopic cover are constantly subjected to impact while the movable part of the telescopic cover is operating, the cushioning parts undergo abrasion or breakage. The cushioning members, which are normally implicitly designed as consumable items, need regular checking and part replacement. However, due to limitations concerning a usage environment and the structure of the plate covers, the cushioning members are typically attached to the inner portions of the plate covers, as described above.

Figure 2A:
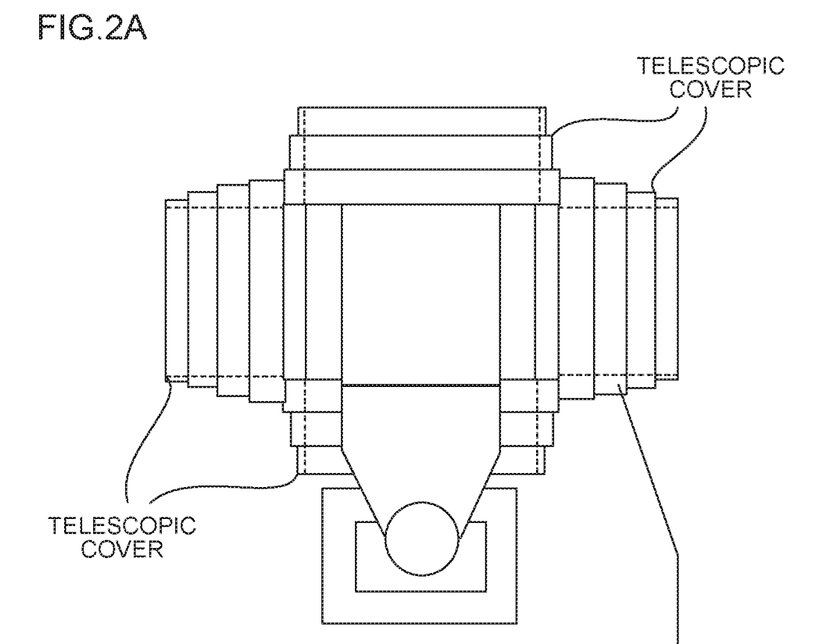
FIGS. 2A-2B are views showing an example of the telescopic cover to which cushioning members are attached.
Figure 2B:
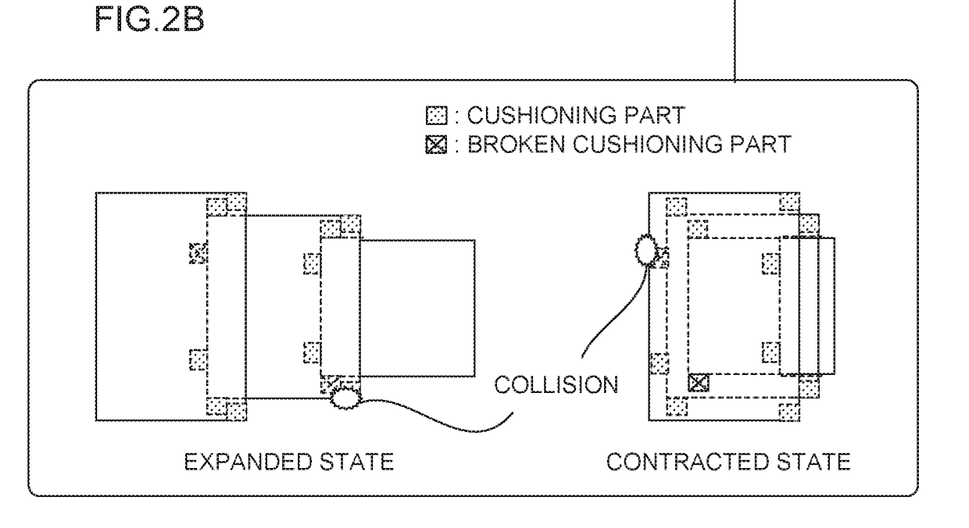

FIG. 2 shows an example of a telescopic cover to which cushioning members are attached. FIG. 2A shows the state where the telescopic cover is attached to the four sides of the table of a machine tool. On the other hand, FIG. 2B is a view showing the states of the cushioning members attached to the inner portions of the telescopic cover (each of the portions enclosed in the dotted lines corresponds to an unseen portion under another plate cover, which is shown in a see-through manner). As shown in FIG. 2B, the cushioning members are attached to the portions of the telescopic cover which collide with each other when the telescopic cover is expanded or contracted. Accordingly, when the cushioning members are abraded or broken, the plate covers collide with each other to be broken during the expansion or contraction of the telescopic cover. While the breakage and abrasion of the cushioning members can be avoided through regular checking and part replacement, the state recognition and replacement of the cushioning parts necessitates the removal of the plate covers or the like, and cannot be easily performed. Consequently, some users may fail to perform a checking operation and continue to use the cushioning parts. In such a case, not only the cushioning parts are abraded or broken, but also the main bodies of the plate covers may be broken.

The occurrence of such breakage not only disturbs the safe and stable operation of the machine tool, but also creates the need for significant time and cost of repairs.

Japanese Patent Application Laid-Open No. 2016-68183 discloses a known technique in which, when an abnormality occurs in an extending/contracting operation of a telescopic cover, the state thereof is promptly sensed. According to the technique, a light emitter and a light receiver are provided in the telescopic cover and, when the light generated from the light emitter is blocked by a plate body and is not received by the light receiver, it is determined that an abnormality has occurred.

However, the technique described above allows only an abnormality such as a change in the preliminarily assumed form of a preliminarily assumed member to be detected. In addition, what is obtained is only the effect of allowing, at the occurrence of an abnormality, early detection thereof. It is impossible to obtain the effect of recognizing an event leading to the occurrence of an abnormality and predicting a situation where an abnormality may occur.

SUMMARY OF THE INVENTION

The present invention has been achieved in order to solve such a problem and an object thereof is provide an apparatus and a method for presuming abnormality occurrence which allow the occurrence of an abnormality such as a fracture in a telescopic cover and abrasion or breakage of cushion parts to be predicted.

An abnormality occurrence presumption apparatus for a telescopic cover according to the present invention presumes occurrence of an abnormality associated with a telescopic cover attached to a device, and includes a learning result storage unit which stores a learning result of supervised learning performed on the basis of a feature amount extracted from a physical quantity acquired during an operation of the device and on the basis of information related to an abnormality occurring in the telescopic cover, a physical quantity acquisition unit which acquires the physical quantity during the operation of the device, a feature amount extraction unit which extracts the feature amount of the physical quantity on the basis of the physical quantity acquired by the physical quantity acquisition unit, an abnormality presumption unit which presumes an abnormality that may occur in the telescopic cover during the operation of the device on the basis of the learning result stored in the learning result storage unit and on the basis of the feature amount extracted by the feature amount extraction unit, and a presumption result output unit which outputs the abnormality presumed by the abnormality presumption unit.

The abnormality occurrence presumption apparatus can further include a supervised learning unit which performs supervised learning on the basis of the feature amount extracted from the physical quantity acquired during the operation of the device and on the basis of the information related to the abnormality occurring in the telescopic cover, and stores a result of the learning in the learning result storage unit.

The feature amount of the physical quantity may be a numerical value showing a feature of the physical quantity.

The physical quantity may be at least any one of a sound and vibration produced by the device and a current value in the device.

The physical quantity acquisition unit may acquire the physical quantity during the operation of the device based on a machining program, during the operation of the device based on a predetermined block which is defined in advance among blocks in the machining program, or during the operation of the device based on a determination program.

An abnormality occurrence presumption method for a telescopic cover according to the present invention is a method which presumes an abnormality in a telescopic cover attached to a device and includes the steps of operating the device with the telescopic cover being attached thereto, acquiring a physical quantity associated with the device when the device is operated, extracting a feature amount of the acquired physical quantity, performing supervised learning which receives, as inputs, correct answer information related to an abnormality occurring in the telescopic cover and the extracted feature amount, and presuming an abnormality that may occur in the telescopic cover on the basis of a learning result of the supervised learning when an arbitrary feature amount of the physical quantity is input.

The feature amount of the physical quantity may be a numerical value showing a feature of the physical quantity.

The physical quantity may be at least any one of a sound and vibration produced by the device and a current value in the device.

The physical quantity may be acquired during the operation of the device based on a machining program, during the operation of the device based on a predetermined block which is defined in advance among blocks in the machining program, or during the operation of the device based on a determination program.

The present invention can provide the abnormality occurrence presumption apparatus and the abnormality occurrence presumption method which allow the occurrence of an abnormality such as a fracture in a telescopic cover or abrasion/breakage of a cushioning part to be predicted. By introducing the abnormality occurrence presumption apparatus according to the present invention, it is possible for a user of a machine tool to recognize that the very telescopic cover or the cushioning part attached to the telescopic cover is abraded or broken and a plate cover needs repair and maintenance without performing regular checking and part replacement. This allows planned preventive maintenance to be performed before the machine suddenly breaks down/stops and leads to an improved operating rate and stably maintained production. In addition, since only a consumable item such as the cushioning part can be replaced when the cushioning part is abraded or broken, it is possible to prevent subsequent breakage of the very plate cover. This leads to reduced maintenance cost and time.

DETAILED DESCRIPTION

The present invention uses machine learning to presume the occurrence of an abnormality in a telescopic cover with high precision. In the machine learning in the present invention, features are extracted from various physical quantities (such as vibration, sound, and current) generated at the occurrence of an abnormality and at a normal time and the relationships between the amounts of the extracted features and the abnormality (such as the position and state of breakage of a telescopic cover, and abrasion state or breakage position of cushion parts) that has occurred are machine-learned.

First, a brief description will be given of the machine learning used in the present invention.

1. Machine Learning

Machine learning is implemented by extracting, from a data set input to a device which performs machine learning (hereinafter referred to as a learning machine), a useful rule, a knowledge expression, a criterion for determination, or the like included therein through the analysis thereof and outputting the result of the analysis, while learning knowledge. There are various methods for machine learning, which are roughly divided into "supervised learning", "unsupervised learning", and "reinforcement learning". There is also a method referred to as "deep learning" which learns the extraction of very feature amounts in implementing such methods.

The "supervised learning" is a model which gives a large number of input-result (label) data pairs to a learning machine to allow the learning machine to learn the features included in the datasets and deduce the results from the inputs, i.e., a method which inductively acquires the relationships therebetween. This can be implemented using an algorithm for a neural network described later or the like.

The "unsupervised learning" is a method which gives only a large amount of input data to a learning machine to allow the learning machine to learn how the input data is distributed and perform compression, classification, shaping, or the like on the input data without giving the corresponding teacher output data. The method allows the clustering of similar features included in the datasets and the like. By using the result, a certain criterion is provided and the allocation of outputs which optimizes the criterion is performed to allow the outputs to be predicted.

As an intermediate problem solution set between the "unsupervised learning" and the "supervised learning", there is a method referred to as "semi-supervised learning" which corresponds to the case where some of datasets include input-output data pairs, while the other datasets include only input data. In the present embodiment, data which can be acquired without actually operating a machine tool is used for unsupervised learning to allow efficient learning to be performed.

The "reinforcement learning" is a method which allows a learning machine to learn not only determination or classification, but also a behavior in order to learn an appropriate behavior through the interaction between the behavior and an environment, i.e., maximize a reward obtainable in future. In the reinforcement learning, the learning machine is allowed to start learning in a state where the learning machine knows nothing about or knows only incompletely a result caused by a behavior. Alternatively, the learning machine is also allowed to start learning from a good starting point where, in an initial state, the learning machine has learned in advance to mimic a human behavior (a method such as inverse reinforcement learning or the supervised learning described above).

The present invention aims at allowing the learning machine to learn the relationship between a feature amount extracted from the physical quantity acquired during the operation of a telescopic cover and an abnormality (such as the position where breakage of a telescopic cover or abrasion or breakage of cushion parts has occurred or the state of such breakage) which has occurred in the telescopic cover. The present invention uses an algorithm for the supervised learning in consideration of such facts that learning based on specified data can be performed and that it is necessary to determine the abnormal state of the telescopic cover on the basis of the result of learning.

Figure 3A:
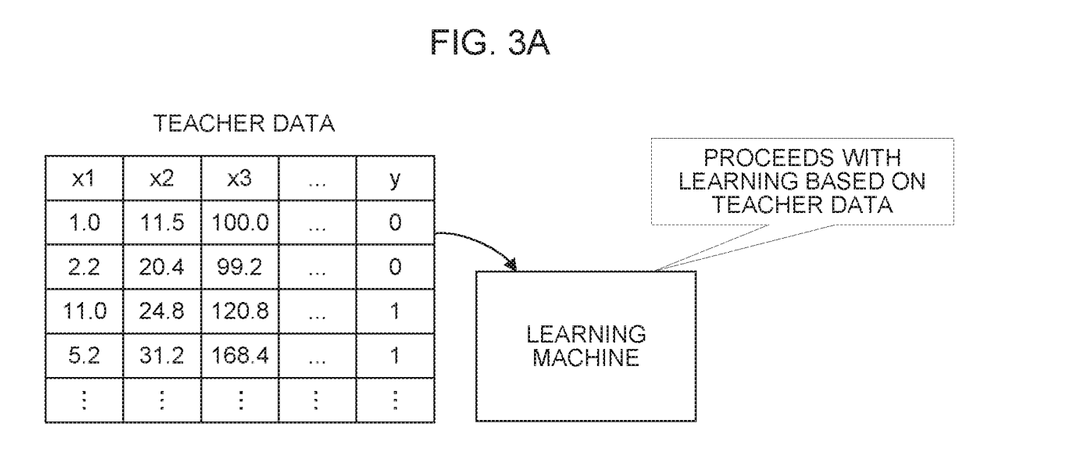
FIGS. 3A and 3B are views illustrating the outline of the operation of a learning machine which performs supervised learning (FIG. 3A shows a learning stage and FIG. 3B shows a prediction stage based on the result of learning)
Figure 3B:
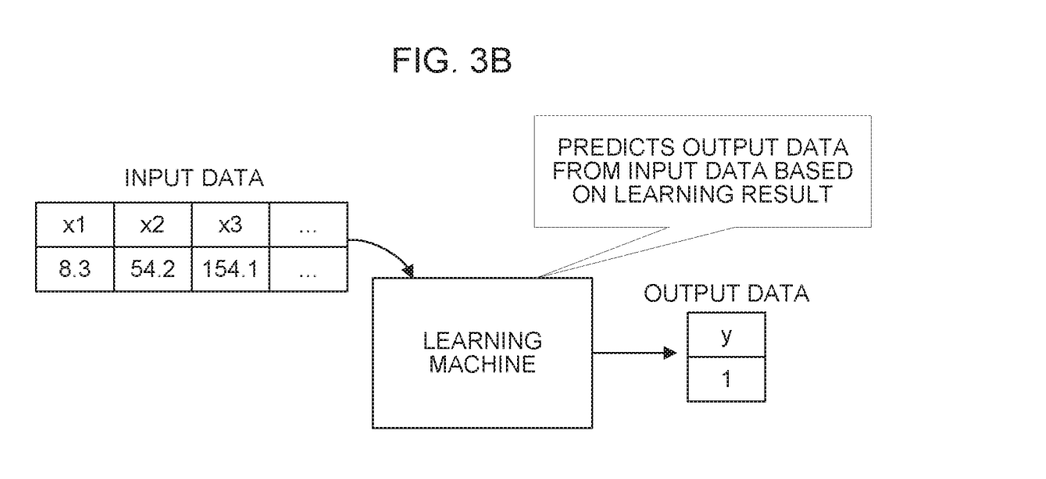

FIGS. 3A and 3B are views illustrating the outline of the operation of the learning machine which performs the supervised learning.

The operation of the learning machine which performs the supervised learning can be roughly divided into two stages, i.e., a learning stage and a prediction stage. At the learning stage (FIG. 3A), when teacher data including the values of state variables (explanatory variables which are $x_1$, $x_2$, $x_3$, ... in FIG. 3A) used as input data and the value of an objective variable (y in FIG. 3A) used as output data is given to the learning machine which performs the supervised learning, the learning machine learns to output the value of the objective variable when the values of the state variables are input thereto. By being given a large number of such teacher data items, the learning machine is allowed to build a prediction model (function f which performs mapping) for outputting the value of the objective variable corresponding to the values of the state variables.

When given new input data (state variables) at the prediction stage (FIG. 3B), the learning machine which performs the supervised learning predicts output data (objective variable) in accordance with the learning result (built prediction model) and outputs the predicted output data.

As an example of the learning performed by the learning machine which performs the supervised learning, there is a method which uses, e.g., such a regression formula as shown below in Formula (1) as the prediction model (function f which performs mapping). In the method using the regression formula, the learning machine keeps learning by adjusting the respective values of individual coefficients $a_0$, $a_1$, $a_2$, $a_3$, ... such that the value of the objective variable (correct answer information) y is obtained when the respective values of the individual state variables $x_1$, $x_2$, $x_3$, ... in Formula (1) are assigned to the regression formula in the process of learning.

$$y = a_0 + a_1 x_1 + a_2 x_2 + a_3 x_3 + \cdots + a_n x_n \quad (1)$$

Figure 4:
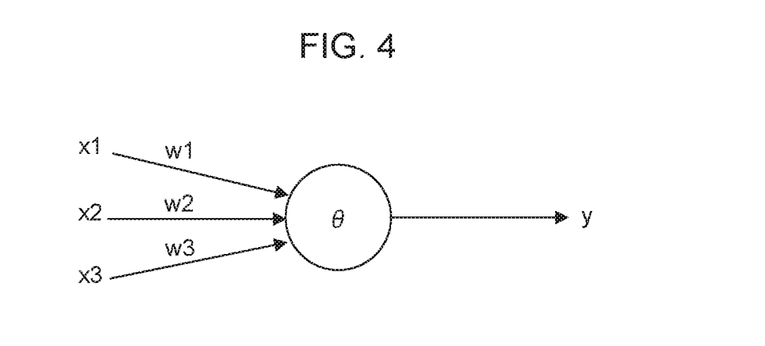
FIG. 4 is a schematic diagram showing a model of a neuron.

As another example of the learning performed by the learning machine which performs the supervised learning, there is a method which uses, e.g., a neural network as the prediction model (function f which performs mapping). The neural network includes an arithmetic operation device, a memory, and the like which implement a neural network representing a model of a neuron as shown in, e.g., FIG. 4. FIG. 4 is a schematic diagram showing a model of a neuron.

As shown in FIG. 4, the neuron outputs correct answer information y corresponding to an input x (which is, e.g., the plurality of inputs $x_1$ to $x_3$). The inputs $x_1$ to $x_3$ are multiplied by respective weights w ($w_1$ to $w_3$) corresponding to the input x. Thus, the neuron outputs the correct answer information y given by Formula (2) shown below. Note that, in Formula (2), each of the input x, the correct answer information y, and the weight w is a vector, θ is a bias, and $f_k$ is an activation function.

$$y = f_k(\Sigma_{i=1}^{n} x_i w_i - \theta) \quad (2)$$

Figure 5:
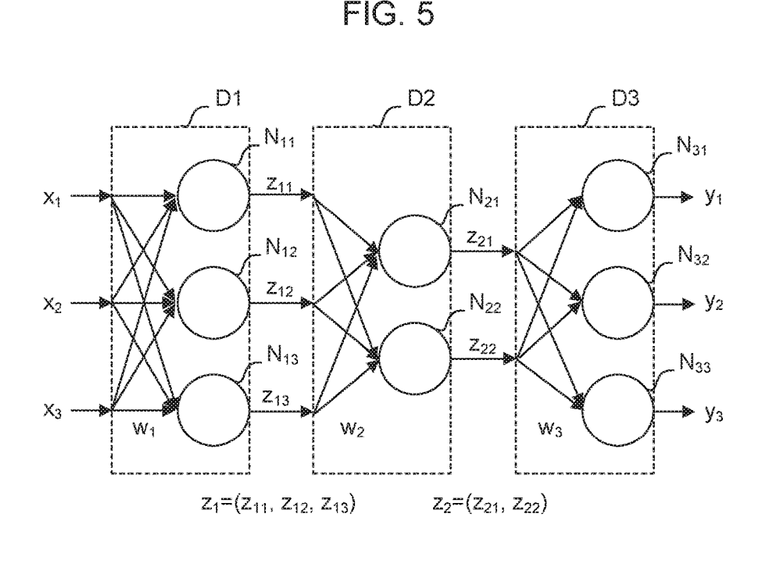
FIG. 5 is a schematic diagram showing a neural network having a three-layered weight.

As an application of the method which uses the neural network for the learning performed by the learning machine which performs the supervised learning, there is a method which uses a neural network having three-layered weights obtained by combining the neurons described above as the prediction model (function f which performs mapping). FIG. 5 is a schematic diagram showing a neural network having weights in three layers D1 to D3. In the example shown in FIG. 5, the input x (which is, e.g., the plurality of inputs $x_1$ to $x_3$) is input to the neural network from the left side thereof, while the correct answer information y (which is, e.g., the plurality of correct answer information items $y_1$ to $y_3$) from the neural network to the right side thereof.

Specifically, the inputs $x_1$ to $x_3$ are multiplied by respective weights corresponding to three neurons $N_{11}$ to $N_{13}$ and input to the respective neurons $N_{11}$ to $N_{13}$. In FIG. 5, the respective weights by which these inputs are multiplied (weights by which the inputs $x_1$ to $x_3$ to be input to the respective neurons are multiplied) are collectively shown as a matrix $w_1$. The neurons $N_{11}$ to $N_{13}$ produce respective outputs $z_{11}$ to $z_{13}$. These outputs $z_{11}$ to $z_{13}$ are collectively shown as a feature vector $z_1$, which can be regarded as a vector resulting from the extraction of the feature amount of an input vector. The feature vector $z_1$ is a feature vector between the weights $w_1$ and $w_2$.

The feature vectors $z_{11}$ to $z_{13}$ are multiplied by respective weights corresponding to two neurons $N_{21}$ and $N_{22}$ and input to the respective neurons $N_{21}$ and $N_{22}$. In FIG. 5, the respective weights by which these feature vectors are multiplied (weights by which the respective elements of the feature vectors to be input to the respective neurons are multiplied) are collectively shown as a matrix $w_2$. The neurons $N_{21}$ and $N_{22}$ produce respective outputs $z_{21}$ and $z_{22}$. These outputs $z_{21}$ and $z_{22}$ are collectively shown as a feature vector $z_2$. The feature vector $z_2$ is a feature vector between the weights $w_2$ and $w_3$.

The feature vectors $z_{21}$ and $z_{22}$ are multiplied by respective weights corresponding to three neurons $N_{31}$ to $N_{33}$ and input to the respective neurons $N_{31}$ to $N_{33}$. In FIG. 5, the respective weights by which these feature vectors are multiplied (weights by which the respective elements of the feature vectors to be input to the respective neurons are multiplied) are collectively shown as a matrix $w_3$.

Finally, the neurons $N_{31}$ to $N_{33}$ output respective correct answer information items $y_1$ to $y_3$.

The operation of the neural network shown in FIGS. 3 and 4 has a learning mode (corresponding to the learning stage in FIG. 3A) and a prediction mode (corresponding to the prediction stage in FIG. 3B). In the learning mode, using a learning dataset, each of the weights w is learned. In the prediction mode, using the parameter, the prediction of an abnormality in the telescopic cover is performed (for the sake of convenience, the term "prediction" is used, but various tasks such as detection, classification, and deduction are possible).

Note that it is also possible to either immediately learn data obtained by actually moving the telescopic cover in the prediction mode and reflect the result of the learning on the subsequent behavior (on-line learning) or perform collective learning using data groups collected in advance and continue to carry out a sensing mode afterwards using the resulting parameters (batch learning). As an intermediate method between the on-line learning and the batch learning, it is also possible to intermittently carry out a learning mode every time a certain amount of data is collected.

The weights $w_1$ to $w_3$ can be learned in accordance with an error backpropagation method. Information on an error enters from the right side and flows to the left side. The error backpropagation method adjusts (learns), for each of the neurons, the weight of the neuron so as to reduce the difference between the correct answer information y output when the input x is input and the true correct answer information y (teacher).

It is also possible to increase the layers of the neural network to more than three layers (referred to as deep learning). It is possible to automatically acquire, only from the teacher data, an arithmetic operation device which stepwise extracts the features of the inputs and performs the regression of the results.

As other algorithms for the supervised learning, various methods such as a least square method, a stepwise method, SVM, and decision tree learning are known. As a method to be applied to the present invention, any supervised learning algorithm may be used. Each of the other supervised learning algorithms, the method using the regression formula shown above, the method using the neural network described above, and the like are known so that a more detailed description of each of the algorithms is omitted in the present specification.

Next, a specific description will be given of an apparatus and a method for presuming abnormality occurrence for a telescopic cover of the present invention using the supervised learning described above.

2. Embodiment

Figure 6:
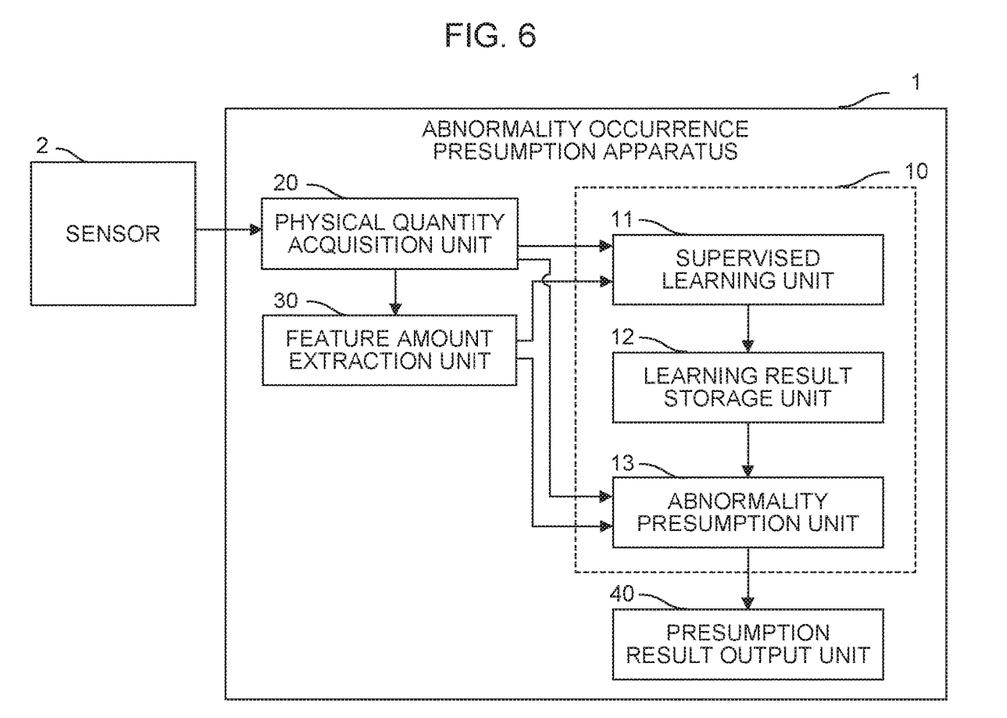
FIG. 6 is a block diagram showing a schematic configuration of an abnormality occurrence presumption apparatus for a telescopic cover.

FIG. 6 is a block diagram showing a schematic configuration of an abnormality occurrence presumption apparatus 1 for a telescopic cover in an embodiment of the present invention.

Typically, the abnormality occurrence presumption apparatus 1 can be embodied as an information processing apparatus such as a computer connected to a sensor 2 described later via a communication line, a signal line, or the like. The abnormality occurrence presumption apparatus 1 includes a supervised learning machine 10 (dotted line frame in the drawing), a physical quantity acquisition unit 20, a feature amount extraction unit 30, and a presumption result output unit 40.

The sensor 2 includes various sensors such as a vibration sensor or a sound sensor attached to a machining tool or the telescopic cover and a measuring instrument (not shown) connected to any of the foregoing various sensors, a numerical controller capable of acquiring the position, speed, acceleration or load (current value) of a motor that drives each of axes of the machining tool, a current value therein, etc., or the like. That is, the sensor 2 includes any technical means capable of acquiring various physical quantities associated with the machining tool or the telescopic cover and outputting the acquired physical quantities as sensor values to the abnormality occurrence presumption apparatus 1.

The physical quantity acquisition unit 20 acquires the sensor values output from the sensor 2 in the abnormality occurrence presumption apparatus 1. The acquired sensor values include measured data such as the sound or vibration generated by the machining tool or the telescopic cover when each of the axes of the machining tool moves (during a rapid traverse operation or a cutting feed operation), and the position, speed, acceleration, or load (current value) of a motor that drives each of axes of the machining tool. Note that the physical quantity acquisition unit 20 may also be configured to acquire the sensor values from the sensor 2 when the supervised learning machine 10 is operating at the learning stage.

The feature amount extraction unit 30 extracts a feature amount from each of the sensor values acquired by the physical quantity acquisition unit 20. The feature amount extracted by the feature amount extraction unit 30 may also be an amount which can be quantified using a conventional typical statistic method such as, e.g., the maximum value, minimum value, average value, and variance value of the waveform data of a sound, vibration, or a current value of a motor that drives each of axes of a machine tool, the timing of a change in the inclination of the waveform data, or the value (time or position) of a physical quantity at the timing. Alternatively, the very shape of the change pattern of a sensor value during a given period may also be used as the feature amount. Still alternatively, the feature amount may also be extracted for each of a plurality of physical quantity sets.

For example, as shown in "Ensemble Learning with Neural Networks to Classify Traffic Sounds" by Asato Shimotaki and five others, 47th Proceedings of the Japan Joint Automatic Control Conference (published on Jan. 11, 2005), the feature amount extraction unit 30 equally divides waveform data showing a change in sound pressure into a plurality of intervals along a time axis. That is, the waveform data sampled at a predetermined rate is divided into intervals each including a predetermined number of samples. Then, the total value of sound pressures in the interval is assumed to be an interval sound pressure, and a FFT (fast Fourier transformation) process is performed on each of the interval sound pressures. Finally, with regard to the plurality of frequency characteristics obtained, a maximum value at each of the frequencies can be used as a feature amount. In order to reduce the amount of subsequent calculation, the feature amount extraction unit 30 can also calculate the average value of the predetermined number of multiple feature amounts thus obtained and use the average value as a feature amount having a reduced number of dimensions. The feature amount extraction unit 30 can also normalize these feature amounts such that the normalized feature amounts fall within a range of 0 to 1 and use the resulting feature amounts as a final input to the learning machine 10.

The feature amount extraction unit 30 may also apply the feature amount extraction method described above to the waveform data of vibration, current, and the like and extract the respective feature amounts of the physical quantities. Note that the physical quantities and the feature amounts each described above are only exemplary. As a feature amount, any value may be used as long as the value can show the feature of a physical quantity.

The abnormality occurrence presumption apparatus 1 includes the supervised learning machine 10 (dotted-line frame in the drawings). To the abnormality occurrence presumption apparatus 1, various physical quantities output from the sensor 2 are transmitted. A supervised learning unit 11, a learning result storage unit 12, and an abnormality presumption unit 13 each included in the supervised learning machine 10 form the main part of the supervised learning machine 10.

Figure 7A:
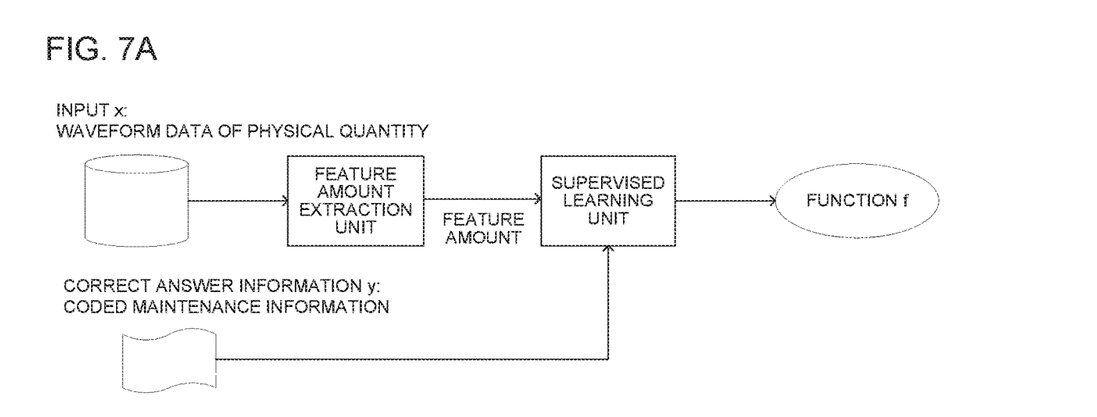
FIGS. 7A-7B are views showing the outline of the operation of the abnormality occurrence presumption apparatus for a telescopic cover at the learning stage and the prediction stage.

When the supervised learning machine 10 is set at the learning stage, the supervised learning unit 11 performs supervised learning and stores the result of the learning in the learning result storage unit 12. As shown in FIG. 7A, the supervised learning unit 11 in the present embodiment receives, as inputs, the feature amount extracted by the feature amount extraction unit 30 and the correct answer information y as the teacher data and proceeds with the supervised learning. The correct answer information y shows the content of the abnormality occurring in the telescopic cover.

In the leaning performed by the supervised leaning unit 11, it may be possible to use the feature amount extracted from the physical quantity acquired when the telescopic cover operates according to an instruction from a typical machining program. However, in such a case, various disturbances which occur during machining may possibly reduce the accuracy of the leaning. When such a situation is to be avoided, it may also be possible to prepare a determination program in advance which causes a machine tool to operate in an operation pattern that allows easy determination of, e.g., the broken state of the telescopic cover or the abraded/broken state of a cushioning part (such as, e.g., an operation pattern that causes a table to move alternately from front to back and from side to side to limit positions) and use the feature amount extracted from the physical quantity acquired when the determination program is allowed to run (e.g., before the machining is started) for the learning. It can also be considered that, even when the feature amount extracted from the physical quantity acquired when the machining program is executed is used for the learning performed by the supervised leaning unit 11, a block which gives an instruction to output a signal or the like is preliminarily placed before or after a block which gives an instruction to perform an operation that allows easy determination of the broken state of the telescopic cover or the abraded/broken state of the cushioning part, and the feature amount extracted from the physical quantity acquired during the operation in the range where the signal is detected is used for the leaning.

Figure 8:
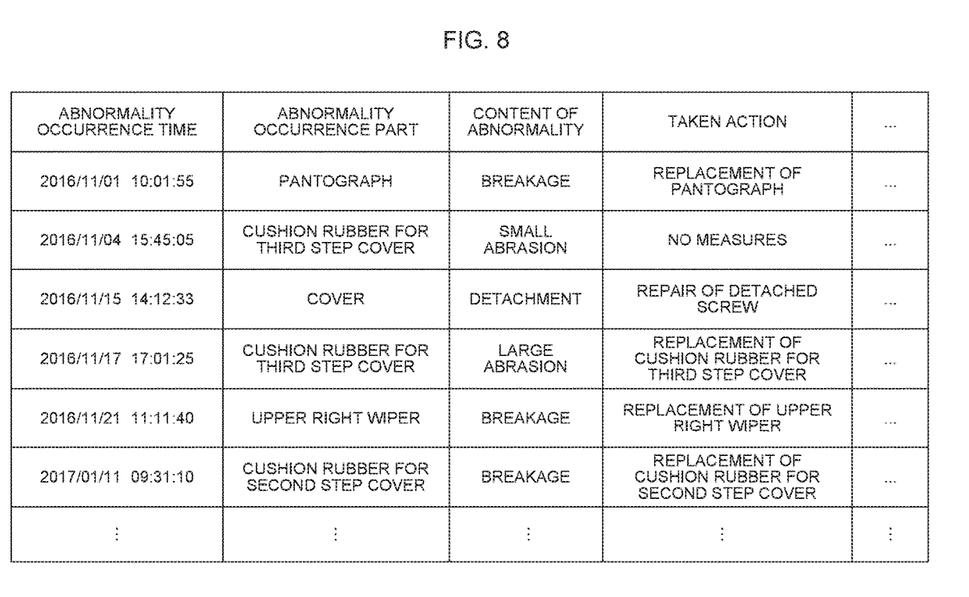
FIG. 8 is a view showing an example of correct answer information y.

FIG. 8 shows an example of the correct answer information y. When an abnormality occurs in the telescopic cover, a worker who has taken an action such as repair inputs an abnormality occurrence time, an abnormality occurrence part, the content of the abnormality, the taken action, and the like as maintenance information to the input device of the machining tool or the like. The input maintenance information is stored in the storage region (not shown) of a device inside or outside the abnormality occurrence presumption apparatus 1. The correct answer information y shown in FIG. 8 is a code obtained by coding the abnormality occurrence part, the content of an abnormality, the taken action, and the like as text data included in the maintenance information. The code may be input when the worker produces the maintenance information or may also be generated afterwards by the worker by analyzing the maintenance information.

The supervised learning unit 11 receives, as an input, a pair of one item of the correct answer information y (i.e., one of the records in the table shown in FIG. 8) and a feature amount generated from the physical quantity acquired when the abnormality corresponding to the correct answer information item y occurred. More specifically, the correct answer information item can be paired up with the feature amount corresponding to the interval during which a physical quantity, among physical quantities acquired during a predetermined period around the abnormality occurrence time in the correct answer information item y, has reached a level (such as pressure sound level) of not less than a predetermined value.

The supervised learning unit 11 also receives, as an input, a pair of a feature amount generated from the physical quantity acquired when no abnormality occurred and the correct answer information item y which indicates no abnormality occurrence (see FIG. 8). The supervised learning unit 11 may receive, as an input, a feature amount corresponding to an interval before or after the above-mentioned interval during which the abnormality occurred or may also receive a feature amount generated regularly or at a random time and not generated during the above-mentioned interval during which the abnormality occurred.

When the supervised learning unit 11 thus receives the feature amount and the correct answer information item y, the supervised learning unit 11 can be embodied by using an identification-type supervised learning method. In this case, it is appropriate that, using a neural network, a non-linear decision boundary which allows the correct answer information item y to be identified on the basis of the input x is generated and used as the function f.

The learning result storage unit 12 stores the result of the learning performed by the supervised learning unit 11 on the basis of the teacher data. When, e.g., the regression formula shown above is used as the prediction model, the learning result storage unit 12 stores the regression formula obtained as the learning result. When, e.g., the learning method using the neural network described above is used as the prediction model, the learning result storage unit 12 stores the parameters of the neural network obtained as the learning result. The learning result storage unit 12 outputs the stored learning result in response to a request from the outside. This function also allows the learning result stored in the learning result storage unit 12 to be transferred to another abnormality occurrence presumption apparatus or the like and used therein.

Figure 7B:
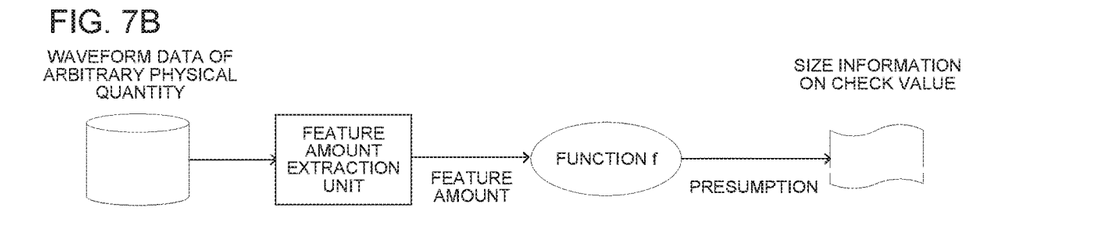

As shown in FIG. 7B, when the supervised learning machine 10 is at the prediction stage, the abnormality presumption unit 13 presumes the abnormality occurrence part, the content of the abnormality, the action to be taken, and the like on the basis of the learning result stored in the learning result storage unit 12 and using the physical quantity acquired by the physical quantity acquisition unit 20 and the feature amount extracted by the feature amount extraction unit 30.

In the presumption of an abnormality performed by the abnormality presumption unit 13, it may be possible to use the feature amount extracted from the physical quantity acquired when the telescopic cover operates according to an instruction from a typical machining program. However, in the same manner as during the learning, it may also be possible to prepare in advance a determination program which causes a machine tool to operate in an operation pattern that allows easy determination of, e.g., the broken state of the telescopic cover or the abraded/broken state of the cushioning part (such as, e.g., an operation pattern that causes a table to tilt alternately from front to back and from side to side to limit positions) and presume an abnormality in the telescopic cover on the basis of the feature amount extracted from the physical quantity acquired when the determination program is allowed to run (e.g., before the machining is started). Even when the feature amount extracted from the physical quantity acquired when the machining program is executed is used for the presumption of an abnormality performed by the abnormality presumption unit 13, it may also be possible to preliminarily place a block which gives an instruction to output a signal or the like before or after a block which gives an instruction to perform an operation that allows easy determination of the broken state of the telescopic cover or the abraded/broken state of the cushioning member, and use the feature amount extracted from the physical quantity acquired during the operation in the range where the signal is detected for the presumption of an abnormality in the telescopic cover.

Then, the presumption result output unit 40 outputs the abnormality occurrence part, the content of the abnormality, the action to be taken, and the like which are presumed by the abnormality presumption unit 13 to a display device (not shown). The presumption result output unit 40 may also be configured such that, when abnormality occurrence is presumed, the presumed abnormality occurrence is output as a warning. This allows an operator to take an action for preventing abnormality occurrence on the basis of the content of the warning.

While the embodiment of the present invention has been described heretofore, the present invention is not limited only to the example in the embodiment described above. The present invention can be implemented in various forms by adding, modifying, or removing an appropriate element. For example, the physical quantity, the feature amount, and the teacher data which are recited in the embodiment described above are only exemplary. It is possible to use a physical quantity, a feature amount, and teacher data each showing the operating state or abnormal state of the telescopic cover.

The embodiment described above shows the form in which, for the sake of convenience, learning and presumption is performed using the physical quantity, the feature amount, and the teacher data each associated with one telescopic cover, but the present invention is not limited thereto. For example, the abnormality occurrence presumption apparatus 1 can efficiently proceed with learning by collecting physical quantities, feature amounts, and teacher data each associated with a plurality of telescopic covers of the same type located in a factory or at a plurality of locations and performing learning and presumption.

Also, in the embodiment described above, the abnormality occurrence presumption apparatus 1 is provided with the supervised learning unit 11. However, when it is assumed that, e.g., the result of the learning performed in another abnormality occurrence presumption apparatus 1 is copied into the learning result storage unit 12 and used, the supervised learning unit 11 need not be mounted. When such a configuration is used, a feature of a new telescopic cover cannot be leaned. However, when the existing learning result is applied to a telescopic cover of the same type, by using the exiting learning result, appropriate abnormality presumption can be performed without incorporating a mechanism for learning.

The invention claimed is:

1. An abnormality occurrence presumption apparatus for a telescopic cover for presuming occurrence of an abnormality associated with the telescopic cover attached to a device, the abnormality occurrence presumption apparatus comprising:
    a learning result storage unit which stores a learning result of supervised learning performed on the basis of a feature amount extracted from a physical quantity acquired during an operation of the device and on the basis of information related to an abnormality occurring in the telescopic cover, wherein the physical quantity includes at least any one of a sound produced by the device and a current value in the device and the abnormality includes at least an abnormality occurrence part;
    a physical quantity acquisition unit which acquires the physical quantity including at least any one of a sound produced by the device and a current value in the device during the operation of the device;
    a feature amount extraction unit which extracts the feature amount of the physical quantity on the basis of the physical quantity acquired by the physical quantity acquisition unit;
    an abnormality presumption unit which presumes an abnormality that may occur in the telescopic cover during the operation of the device on the basis of the learning result stored in the learning result storage unit and on the basis of the feature amount extracted by the feature amount extraction unit, wherein the abnormality includes at least an abnormality occurrence part; and
    a presumption result output unit which outputs the abnormality presumed by the abnormality presumption unit,
    wherein the physical quantity acquisition unit acquires the physical quantity during the operation of the device based on a predetermined block which is defined in advance among blocks in a machining program.

2. The abnormality occurrence presumption apparatus according to claim 1, further comprising:
    a supervised learning unit which performs supervised learning on the basis of the feature amount extracted from the physical quantity acquired during the operation of the device and on the basis of the information related to the abnormality occurring in the telescopic cover, and stores a result of the learning in the learning result storage unit.

3. The abnormality occurrence presumption apparatus according to claim 1, wherein the feature amount of the physical quantity is a numerical value showing a feature of the physical quantity.

4. The abnormality occurrence presumption apparatus according to claim 1, wherein the physical quantity acquisition unit acquires the physical quantity during the operation of the device based on a determination program.

5. The abnormality occurrence presumption apparatus according to claim 1, wherein the physical quantity includes the current value which is an electrical load during the operation of the device.

6. An abnormality occurrence presumption method for presuming occurrence of an abnormality associated with a telescopic cover attached to a device, the abnormality occurrence presumption method comprising:
    operating the device with the telescopic cover being attached thereto;
    acquiring a physical quantity including at least any one of a sound produced by the device and a current value in the device when the device is operated;

extracting a feature amount of the acquired physical quantity;

performing supervised learning which receives, as inputs, correct answer information related to an abnormality occurring in the telescopic cover and the extracted feature amount, wherein the abnormality includes at least an abnormality occurrence part; and presuming an abnormality that may occur in the telescopic cover on the basis of a learning result of the supervised learning when an arbitrary feature amount of the physical quantity is input, wherein the physical quantity includes at least any one of a sound produced by the device and a current value, acquired when the device is operated, wherein the physical quantity is acquired during the operation of the device based on a predetermined block which is defined in advance among blocks in a machining program.

7. The abnormality occurrence presumption method according to claim 6, wherein the feature amount of the physical quantity is a numerical value showing a feature of the physical quantity.

8. The abnormality occurrence presumption method according to claim 6, wherein the physical quantity is acquired during the operation of the device based on a determination program.

9. The abnormality occurrence presumption method according to claim 6, wherein the physical quantity includes the current value which is an electrical load during the operation of the device.

* * * * *